(12) United States Patent
Helt et al.

(10) Patent No.: US 8,695,887 B2
(45) Date of Patent: Apr. 15, 2014

(54) TEMPERATURE COMPENSATION METHOD FOR THERMOSTATS

(75) Inventors: Robert W. Helt, Tyler, TX (US); Amanda Filbeck, Carrollton, TX (US)

(73) Assignee: Trane International Inc., Piscataway, NJ (US)

( * ) Notice: Subject to any disclaimer, the term of this patent is extended or adjusted under 35 U.S.C. 154(b) by 1957 days.

(21) Appl. No.: 11/714,616

(22) Filed: Mar. 6, 2007

(65) Prior Publication Data

US 2008/0217418 A1 Sep. 11, 2008

(51) Int. Cl.
- *F24F 11/053* (2006.01)
- *G05D 23/12* (2006.01)
- *G05D 23/185* (2006.01)
- *B64D 13/00* (2006.01)
- *F24D 19/00* (2006.01)

(52) U.S. Cl.
USPC .................. 236/1 C; 236/91 R; 236/91 D

(58) Field of Classification Search
USPC .............. 236/1 B, 1 C, 91 R, 91 D; 165/211; 700/277, 278
See application file for complete search history.

(56) References Cited

U.S. PATENT DOCUMENTS

| | | | |
|---|---|---|---|
| 4,697,430 A | 10/1987 | Toyoda et al. | |
| 4,793,553 A | 12/1988 | Berman | |
| RE32,960 E * | 6/1989 | Levine | 700/278 |
| 4,995,240 A * | 2/1991 | Barthel et al. | 62/225 |
| 5,105,366 A | 4/1992 | Beckey | |
| 5,285,959 A | 2/1994 | Nanba et al. | |
| 6,304,803 B1 * | 10/2001 | Dao | 701/36 |
| 2004/0244960 A1 * | 12/2004 | Errington et al. | 165/201 |

OTHER PUBLICATIONS

"Chapter 111. Texas Essential Knowledge and Skills for Mathematics", Subchapter B. Middle School retreived from http://ritter.tea.state.tx.us/rules/tac/chapter111/ch111b.pdf on May 12, 2010.*

* cited by examiner

*Primary Examiner* — Alexandra Elve
*Assistant Examiner* — Daniel C Comings
(74) *Attorney, Agent, or Firm* — Conley Rose, P.C.; J. Robert Brown, Jr.; Alan Dawson Lightfoot

(57) ABSTRACT

An air conditioning control system and method for compensating for heat gain or loss in an air conditioned space due to window area and temperature differential between outdoor temperature and indoor temperature. For predetermined amounts of window area, as a percent of total wall area defining an enclosed space, the thermostat setpoint or measured temperature is adjusted as a function of the temperature differential between the enclosed space and the outdoor ambient temperature, for example. Data may be accumulated and stored in a controller memory for various types of structures and rates of heat transfer therethrough for various amounts and type of window area as a percent of the total wall area, for example.

8 Claims, 3 Drawing Sheets

TEMPERATURE COMPENSATION METHOD FOR THERMOSTATS

BACKGROUND OF THE INVENTION

A longstanding problem in the operation of heating, ventilating and air conditioning (HVAC) equipment is compensation by the equipment controls, including the temperature sensor or thermostat, for example, in conditions of relatively rapidly changing outdoor temperatures. It is desirable to be able to anticipate the rate of temperature change and to compensate for such change to maintain heating or cooling of the enclosed space being serviced by the HVAC equipment. The ability to compensate for differential temperatures between the outdoor temperature and the temperature of the enclosed space can be aggravated when the structure defining the enclosed space includes a relatively large amount of glass or window area. Efforts to compensate or correct the thermostat setpoint temperature in prior art control systems have relied on radiant temperature sensors, for example. Efforts have also been made to develop methods for predicting the effect of windows on thermal comfort, that is, by providing means to analyze long wave radiation, induced drafts and solar load effects. Although windows or glass walls are not necessarily the primary element effecting the comfort of occupants of an enclosed space, when an occupant is very close to a window or glass wall such structures can become influential and efforts have been made to develop so-called window comfort indexes.

Notwithstanding the state of the art and prior efforts to compensate for temperature differentials between indoor and outdoor temperatures and the amount of window or glass area delimiting an enclosed space being serviced by HVAC equipment, the present invention provides a system and method for improving the thermal comfort level of an enclosed space dependent on the difference between the outdoor and indoor temperatures and the glass or window area exposed to the outdoor temperature as a percentage of the total wall area defining the enclosed space, for example.

SUMMARY OF THE INVENTION

The present invention provides an improved method for compensating or offsetting at least one of the measured temperature and the setpoint temperature of a thermostat or temperature controller for a unit of air conditioning equipment. The compensated or offset temperature value is dependent on the area of the enclosed space being serviced by the equipment, the portion of the area which includes glass walls or windows, for example, and the temperature differential between the indoor temperature and the outdoor temperature which will influence the temperature of the enclosed space.

In accordance with one aspect of the present invention a method is provided for compensating for various differentials between the temperature of an enclosed space and the outdoor temperature influencing the temperature of the enclosed space and taking into consideration the glass or window area of the enclosed space as a percent of the total wall area of the enclosed space. Depending on the percent window or glass wall area delimiting an enclosed space, and the temperature differential between the indoor and outdoor temperature, a predetermined temperature offset is determined. The thermostat or controller then reacts to the offset temperature which is added to or subtracted from at least one of the thermostat setpoint temperature and the measured temperature in the enclosed space, for example. The measured temperature including the offset value may also be displayed by the thermostat so that a person occupying the space would feel in agreement with the displayed value. In this way, the thermal comfort experienced by occupants of the enclosed space is maintained during operating conditions for various temperature differentials between the indoor temperature and the outdoor temperature, for example.

In accordance with another aspect of the present invention, a method of modifying one of the measured temperature and the setpoint temperature of a thermostat or temperature controller for an air conditioning system is provided wherein a selected indoor temperature offset is automatically determined and the thermostat then reacts to the offset as a new temperature value for energizing the air conditioning system to either cool or heat an enclosed air conditioned space, dependent at least in part on the temperature differential between the enclosed space and the outdoor or surrounding environment.

The present invention still further provides a controller for an air conditioning system which includes a database of thermostat offset temperatures dependent on values of temperature differential between indoor and outdoor temperatures and the amount of window or glass area as a percent of the total area defining an enclosed space.

Those skilled in the art will further appreciate the superior features and advantages of the invention together with other important aspects thereof upon reading the detailed description which follows in conjunction with the drawing.

DETAILED DESCRIPTION OF THE PREFERRED EMBODIMENTS

Figure 1:
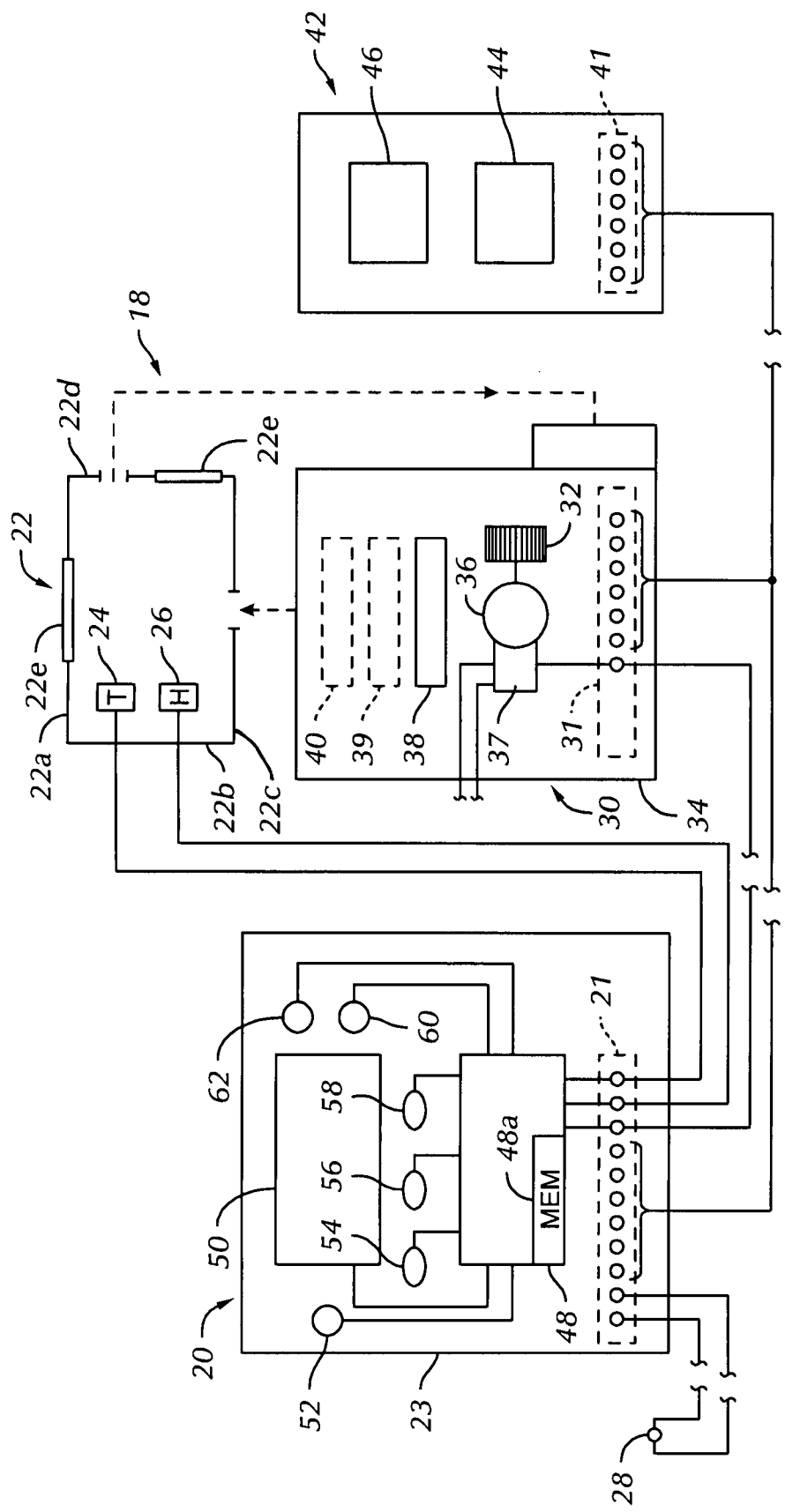
FIG. 1 is a schematic diagram of an air conditioning system for servicing an enclosed space and including a controller or thermostat operable in accordance with the method of the present invention.

In the description which follows like elements are marked throughout the specification and drawing with the same reference numerals, respectively. The drawing figures may show some elements in schematic form in the interest of clarity and conciseness.

Referring to FIG. 1, the present invention utilizes and includes a controller for an HVAC system 18, which controller may be characterized as a thermostat, generally designated by the numeral 20. The thermostat 20 includes certain temperature sensors, such as for sensing or measuring the temperature of an enclosed space 22 by a temperature sensor 24, for example. The system 18 may also include a humidity sensor 26 for sensing or measuring the relative humidity in the enclosed space 22. The thermostat or controller 20 also includes a temperature sensor 28 for sensing or measuring the so-called outdoor temperature surrounding the enclosed space 22. The enclosed space 22 may comprise a private residential dwelling or one or more rooms or spaces in a commercial building, for example. Moreover, the enclosed space 22 may have a total wall area defined by walls 22a, 22b, 22c and 22d and wherein portions of walls 22a and 22d include respective window or glass wall areas 22e, for example, or other structure which would alter heat transfer into or out of space 22.

The illustration and description of the enclosed space 22, as shown in FIG. 1, may be considered to be a plan view of a space having sidewalls 22a, 22b, 22c and 22d exposed to outdoor ambient temperature conditions. A ceiling and floor for the space 22 is not illustrated. Depending on whether or not a ceiling and/or a floor were exposed to outdoor temperature, the area of such might be considered when determining the relationship between the total area exposed to outdoor temperature and the total window or glass area exposed to outdoor temperature, for example, for purposes of performing the method of the present invention. In all events, for carrying out the method of the invention, a relationship between the total area of the enclosed space and the total window or glass wall area of the enclosed space is to be determined and used in determining what amount of offset from the setpoint temperature of or the temperature measured by the thermostat 20 is to be used for anticipating heating or cooling effect to be delivered to the enclosed space to maintain the comfort level in a desired range.

The temperature within the enclosed space 22 is controlled by the HVAC or air conditioning system 18 which comprises an indoor unit 30 which may include a forced air flow fan or blower 32 disposed within a suitable cabinet 34 and operable to be driven by an electric motor 36 for circulating air to and from the enclosed space 22 in a conventional manner. Motor 36 is operably connected to a source of electrical power by way of a controller or control unit 37. The indoor unit 30 for the system 18 may include one or more heat exchangers 38, 39 and 40 arranged in series or parallel with respect to air flow through the cabinet 34 and may be characterized as electric resistance grids, heat exchangers associate with a heat pump, a conventional vapor compression type air conditioning system, other chilled or heated fluids, a combustion furnace or a combination of such types of heat exchangers, for example. In other words, the heat exchangers 38, 39 and/or 40 may provide for desired conditioning of the air being circulated through the cabinet 34, and which may include dehumidifying the air.

The air conditioning system 18, which the controller or thermostat 20 may be operable to control, also includes a so-called outdoor unit 42 which may include one or more vapor compression compressor units 44 and 46, for example. The outdoor unit 42 may also include conventional condenser/evaporator type heat exchangers, not shown, operably connected to the heat exchangers 38, 39 and/or 40 thereby making up a conventional single or multi-stage vapor compression air conditioning or heat pump system. Moreover, the thermostat or controller 20, the indoor unit 30 and the outdoor unit 42 are operably interconnected by way of respective electrical conductor terminal strips 21, 31, and 41 whereby control signals may be transmitted to and from the thermostat 20 for controlling operation of motor 36 and associated components normally found in an HVAC system.

Figure 2:
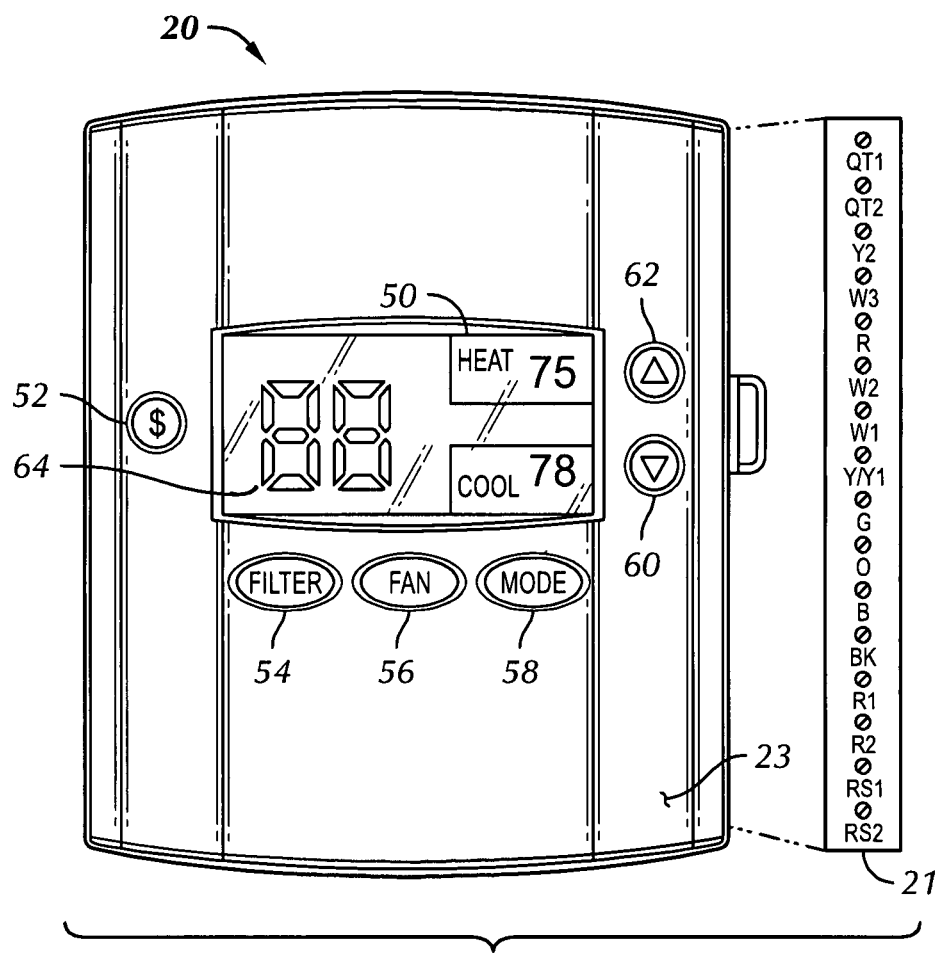
FIG. 2 is a front elevation view of the thermostat shown schematically in FIG. 1.

Referring further to FIGS. 1 and 2, the thermostat 20 includes a suitable housing 23 in which is disposed a microcontroller 48 operably connected to a visual display 50 and to respective user controlled pushbutton type switch actuators 52, 54, 56, 58, 60 and 62, for example. The visual display 50 is operable to display various indicia, such as indicated in FIG. 2, including the actual sensed or measured temperature 64, as well as indicia, not shown, which would appear on the display as a number during installation and set up. Such numbers might correspond to a selected one of various sets of operating profiles or portions of such profiles. Values of heating and cooling temperature setpoints are also shown on display 50 in FIG. 2, and indicated by the numbers adjacent the indicia "HEAT" and "COOL", respectively.

The pushbutton actuator 52 may be utilized to cause the microcontroller 48 to operate in a default mode or a temperature setback mode for energy savings. The pushbutton switch actuators 54, 56, 58, 60 and 62 may be used to display such parameters as the remaining prescribed life of the system air filter, operation of the fan or blower 32, the mode of operation of the system 18, either in heating or cooling, and for increasing and decreasing the "setpoint" temperatures or the desired ambient temperature within the enclosed space 22. FIG. 2 also illustrates a conventional terminal strip which may be mounted on the backside of the housing 23 of the thermostat or controller 20 for making conventional wire connections to terminals or connectors which are appropriately identified with alpha numeric designations according to standards such as prescribed by the American National Standards Institute (ANSI).

Figure 3:
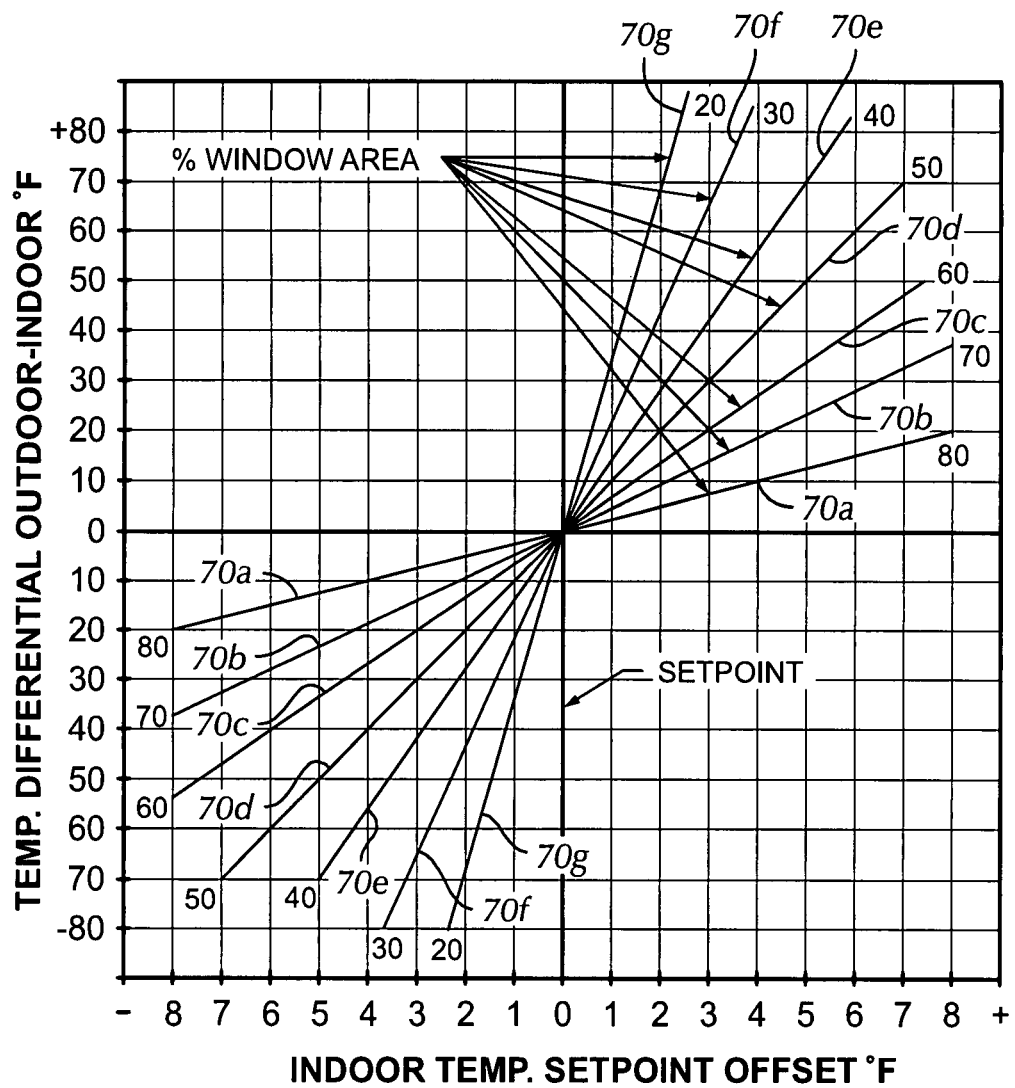
FIG. 3 is a diagram showing datapoints which may be incorporated in a database for the control system of the invention and indicating the methodology of offsetting the thermostat setpoint or measured temperature value.

Referring now to FIG. 3, there is illustrated a diagram showing values on the vertical scale of temperature differentials between the so-called "outdoor" temperature and the "indoor" temperature of enclosed space 22, as measured by the sensors 28 and 24, respectively. The temperature differentials are shown versus temperature offsets for the "setpoint" temperature for the thermostat 20 in degrees F which would be desired for energizing the system 30 to deliver conditioned air to the space 22 to maintain the comfort level selected. It has been determined that the number of degrees of temperature offset from the thermostat setpoint temperature, for example, at which the system 30 is energized is dependent on window or glass wall area as a percent of the total area of the surfaces delimiting the enclosed space 22, for example, for a range of temperature differentials between the outdoor temperature and the indoor temperature, also in degrees F as illustrated in FIG. 3. The lines representing the percent window area of the enclosed space indicate various percentages of the total wall area defining the space and are also designated by the numerals 70a, 70b, 70c, 70d, 70e, 70f and 70g. The so-called "setpoint" temperature as discussed herein, and as shown in FIG. 3, may also be considered to be the temperature measured in the enclosed space 22. The "+" and "−" designations for the horizontal scale in FIG. 3 are correct for offset values to be applied to the measured temperature and the temperature displayed at 64, FIG. 2. If actual thermostat setpoint temperatures were to be offset by the values designated on the horizontal scale, the "+" and "−" signs on the horizontal scale would be reversed from that shown in FIG. 3.

As indicated by the diagram of FIG. 3, enclosed spaces having a high percent of window area will respond to a lower temperature differential with a need to offset the setpoint of the thermostat 20 or offset the temperature of the space 22 measured by the thermostat by a greater amount in order to maintain the comfort level desired. Moreover, for an enclosed space having a predetermined percent window area, the process of the invention also contemplates measuring the rate of change of the differential between indoor and outdoor temperature to possibly provide a further offset to the operable setpoint of the thermostat 20 or the indoor space temperature measured and displayed by the thermostat, for example. The data shown in FIG. 3 may be compiled for particular types of enclosed spaces, that is spaces which are provided with a known type of insulative capability of the walls, ceiling and floor defining the space. The indoor temperature offset factor or values may also take into consideration the particular type of glass in the window or glass wall area or other structural feature and its heat transfer characteristics. Such data may be stored in a memory 48a, FIG. 1, associated with the microcontroller 48.

Accordingly, the microcontroller 48 may be programmed to measure the differential between the temperatures measured by the sensors 24 and 28 and, for a designated percent window area of the area of wall, ceiling or floor structure defining the space 22, continuously or periodically reset the measured temperature or the setpoint temperature by an offset of the number of degrees F as indicated by the diagram of FIG. 3. Still further, the rate of change of the temperature differential may also be monitored and utilized to modify the offset temperature value. Moreover, the relationship between window area as a percent of the total surface area of the structure defining the enclosed space 22 and various differential temperatures between the indoor temperature and the outdoor temperature may not be an exact linear characteristic. However, at least for illustration purposes, such a linear relationship is indicated in FIG. 3.

The thermostat 20, including its microcontroller 48 may continuously monitor the temperature in the enclosed space 22 as well as the outdoor temperature, determine the temperature differential, as well as the rate of change of the temperature differential, and for a predetermined percent window area of the structure defining the enclosed space offset the thermostat setpoint temperature or offset the temperature measured by the thermostat 20 by the requisite amount for the temperature differential and the percent window area. This process may be carried out virtually continuously or at predetermined intervals to compensate for changes in the differential between the outdoor temperature and the indoor temperature. In this way, the thermostat 20 may compensate for the type and amount of window area by, for example, allowing the indoor temperature to increase if the outdoor temperature is low and heat is radiated outside through uncovered windows or, during a cooling mode of operation of the system 18, increasing the offset in the cooling mode to compensate for heat transfer through the window area when the outdoor temperature is much higher than the indoor temperature. Moreover, the method of the invention may take into consideration the need to provide thermostat offsets for structures having certain heat transfer or heat loss characteristics caused by structural features other than window area, for example.

Although preferred embodiments of the method and system of the invention are described herein, those skilled in the art will recognize that various substitutions and modifications to the system and process may be carried out without departing from the scope and sprit of the appended claims.

What is claimed is:

1. In an air conditioning system for providing conditioned air to an enclosed space, a method for compensating for a temperature differential between an outdoor temperature and an indoor temperature of the enclosed space having a predetermined amount of window or glass wall area as a percentage of a total wall area defining said enclosed space exposed to said outdoor temperature, said system including a thermostat including a microcontroller, an indoor temperature sensor for measuring the indoor temperature and an outdoor temperature sensor for measuring the outdoor temperature that is exposed to a structure defining said enclosed space, said method comprising:

determining the amount of window area or glass as a percentage of the total wall area defining said enclosed space;

determining the temperature differential between the indoor temperature of the enclosed space and the outdoor temperature exposed to the structure defining said enclosed space;

adjusting one of said measured indoor temperature and a setpoint temperature of said thermostat by a predetermined offset dependent on said differential temperature and said window area; and measuring a rate of change of the temperature differential between the indoor temperature and the outdoor temperature and adjusting said offset dependent on said rate of change of the temperature differential.

2. The method set forth in claim 1 including:

providing a memory for storing data related to temperature differentials between said indoor temperature and said outdoor temperature and the amount of window area as a percent of total wall area defining said enclosed space for selected amounts of window area.

3. The method set forth in claim 1 including the step of:

allowing the indoor temperature to increase a predetermined amount dependent on the temperature differential between the indoor temperature and the outdoor temperature if heat is being radiated through said window area.

4. In an air conditioning system for providing conditioned air to an enclosed space;

a thermostat;

an indoor temperature sensor for measuring a temperature in said enclosed space;

an outdoor temperature sensor for measuring an outdoor temperature exposed to a structure defining said enclosed space;

a microcontroller operably associated with said thermostat and said sensors, said microcontroller including:

a database operably associated with said microcontroller including, for a given enclosed space, a percent of total wall area defining said enclosed space comprising window or glass wall area;

means for determining a temperature differential between the temperature of said enclosed space and the outdoor temperature, essentially surrounding said enclosed space;

means for adjusting one of the temperature measured in said enclosed space and a setpoint temperature of said thermostat by a predetermined offset temperature value dependent on said temperature differential and said window area; and means associated with said microcontroller for measuring a rate of change of said temperature differential between said temperature in said enclosed space and said outdoor temperature and adjusting said offset temperature value in response to said measured rate of change of said temperature differential.

5. The system set forth in claim 4 including:

a memory associated with said microcontroller for storing data related to said temperature differential between said indoor temperature and said outdoor temperature and the amount of window area as a percent of total wall area defining said enclosed space for selected amounts of window area.

6. In an air conditioning system for providing conditioned air to an enclosed space, a method for compensating for a temperature differential between an outdoor temperature and an indoor temperature of an enclosed spaces having a predetermined amount of an area of a predetermined heat loss rate as a percentage of a total wall area exposed to said outdoor temperature, said system including a thermostat including a microcontroller, an indoor temperature sensor for measuring the temperature in said enclosed space and an outdoor temperature sensor for measuring the outdoor temperature exposed to structure defining said enclosed space, said method comprising:

determining the amount of said area of predetermined heat loss rate as a percentage of the total wall area defining said enclosed space;

determining the temperature differential between the indoor temperature in said enclosed space and the outdoor temperature of the environment, essentially surrounding said enclosed space;

adjusting one of said measured temperatures and a setpoint temperature of said thermostat by a predetermined offset temperature value dependent on said temperature differential and said area of predetermined heat loss rate;

measuring a rate of change of the temperature differential between said indoor temperature in said enclosed space and said outdoor temperature and adjusting the offset temperature value in response to said measured rate of change of the temperature differential.

7. The method set forth in claim 6 including:

providing a memory for storing data related to temperature differential between said indoor temperature and said outdoor temperature and said area of predetermined heat loss rate as a percent of total wall area defining said enclosed space for selected amounts of said area of predetermined heat loss rate.

8. The method set forth in claim 6 including the step of:

allowing said indoor temperature to increase or decrease a predetermined amount dependent on said temperature differential between said indoor temperature and said outdoor temperature if heat is being radiated through said area of predetermined heat loss rate.

* * * * *